May 19, 1959    T. W. VAN RIJSSEL ET AL    2,887,596
TELEVISION CAMERA TUBE
Filed May 10, 1956
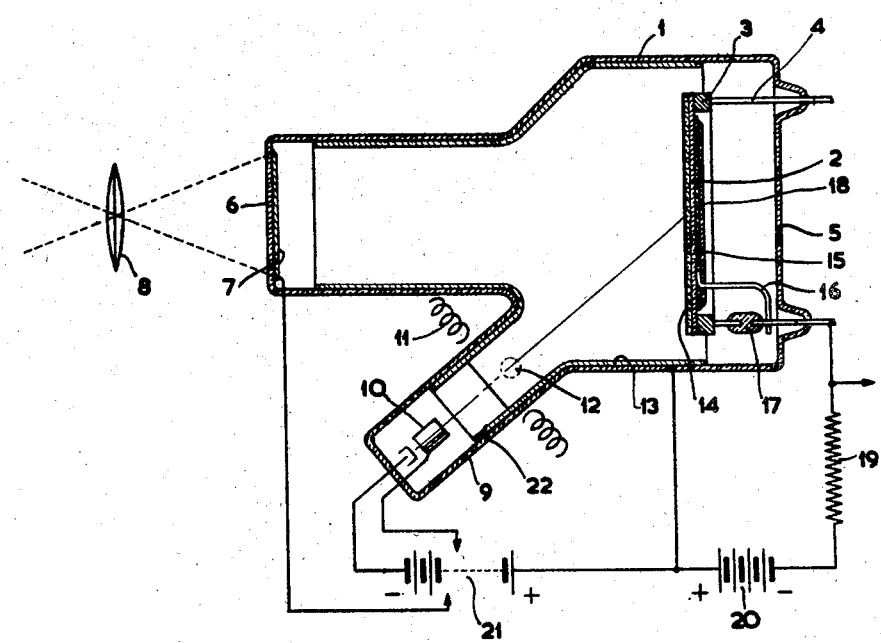
INVENTOR
TIJS WILLEM VAN RIJSSEL
MARTINUS WILLIBALDUS AUGUSTINUS BOERS
BY
AGENT

2,887,596

TELEVISION CAMERA TUBE

Tijs Willem van Rijssel and Martinus Willibaldus Augustinus Boers, Eindhoven, Netherlands, assignors, by mesne assignments, to North American Philips Company, Inc., New York, N. Y., a corporation of Delaware Application May 10, 1956, Serial No. 583,989

Claims priority, application Netherlands May 17, 1955

7 Claims. (Cl. 313—65)

The invention relates to a television camera tube having a target plate of glass. The kinds of glass used to this end contain, as a rule, sodium, but in addition to or instead of this substance it may contain lithium. They exhibit a specific electrical resistivity within the range from $10^9$ to $10^{12}$ ohm-cm. and are referred to as "conductive glass." An example of such a glass is that known in the United States of America as G–B glass exhibiting a specific resistance of approximately $5 \times 10^{10}$ ohm-cm. The side of the target plate on which the charge pattern is formed will be referred to as the image side, the opposite side as the rear side.

Two methods are known to arrange the target plate of glass in the tube. In one method the target plate is supported by a metal disc, which it engages with its complete rear side: in the other method the target plate engages a metal support only with its edge.

The target plate of the tube according to the invention is secured by the last-mentioned method and has, on the rear side, a conductive coating, which may, if necessary, be insulated from the support.

It has been found that not all of the conductive substances, which are otherwise suitable for use in vacuum tubes, can be used to form this coating, which is, of course, thin. Some of these conductive substances give rise to the difficulties referred to below.

The invention is directed to the conductive coating on the rear side of the target plate and has for its object to obviate the difficulties to be referred to hereinafter.

In a television camera tube according to the invention, the target plate of which is constituted by a foil of conductive glass supported at the edge and containing at least one of the alkali metals sodium and lithium, this foil is provided on the rear side with a thin conducting coating which adheres satisfactorily to the glass and is provided with an electrical connection and which is made of a substance which is capable of absorbing or combining with the said alkali metals as far as they are contained in the foil.

If use is made of a substance not having this property, for example aluminum, the adhesion to the glass foil will, as a rule, not persist. Then the tube becomes unserviceable owing to a defective electrical contact between the surface of the conductive glass and the conductive coating. This may presumably be due to the fact that during the operation of the tube charge carriers from the glass are discharged at the conductive coating and form a skin at the surface between the glass and the coating. At any rate it is found that, if a conductive coating of the substance which forms an alloy or a compound with sodium or which takes in sodium in a different manner, for example, absorption, is applied to the sodium-containing, conductive glass, the said drawback does not occur. The same applies, mutatis mutandis to lithium, with which, in general, the same substances may be used to form the conductive coating.

Substances which are known to absorb sodium are for example lead, arsenic, gold, silver, antimony, bismuth, rhodium and palladium. However, not all substances exhibiting this property are suitable to the same degree. For example, lead and tin may give rise to difficulties due to their low melting point. Arsenic and cadmium will preferably not be used on account of their high vapour pressure, while silver is less suitable, since it exhibits a tendency to "cracking" when a thin layer thereof is heated.

In accordance with the invention the use of gold is to be preferred, since this metal is extremely suitable to form a thin layer of good conductivity, which does not give rise to difficulties in a vacuum tube with respect to vapour pressure or melting point. Nevertheless, gold as well as some other substances also exhibits a troublesome phenomenon under certain circumstances. However, according to a further aspect to the invention, this phenomenon can be sufficiently suppressed.

A television camera tube contains, as a rule, cesium. If the tube operates with a photo-electric cathode, which emits electrons focused on the target plate, the cesium may be contained in this cathode. As an alternative, the cesium may form part of a light-sensitive mosaic on the target plate itself or be contained in a separate member which serves as a supply of cesium or as a cesium binder.

In the presence of cesium in the tube, disturbances may be caused, if the substance of the conductive coating on the rear side of the target plate absorbs cesium.

This applies for example to gold. If a gold coating has absorbed cesium out of the tube, it exhibits dark spots. This is not a drawback in itself, but it is found that these spots are reflected in the picture captured by the tube and reproduced by a receiver. This phenomenon could be attributed to unequal contact potentials or similar electric effects.

However, this need not be a reason to abstain from the use of gold. This gold absorbs cesium it is true, but not to such a degree as some of the other aforesaid substances for example antimony and bismuth.

The said disturbances vanish, when the coating is covered with a protective layer of a substance which retains cesium. However, this substance must not form a compound or an alloy with the material of the coating, since this material could then no longer ensure good adhesion.

For the construction of the protective layer use may be made of the metals chromium, iron, nickel and cobalt. Also oxides such as $SiO_2$, SiO, $Al_2O_3$, $TiO_2$ and other compounds, for example cryolite, may form a protective layer against cesium. Use will preferably be made of chromium, since the establishment of a chromium coating is most familiar to those skilled in the art. Consequently, practical considerations lead to the combination of a coating of gold and a protective layer of chromium, but other combinations may also yield the results aimed at.

The invention will be described more fully with reference to the drawing, which shows one embodiment of a tube according to the invention in a sectional view. The drawing is a diagrammatic view and does not pretend to give an exact indication of the proportion of sizes, particularly of those of the layers shown.

Reference numeral 1 designates the wall of the exhausted glass vessel. This vessel comprises two cylindrical parts of different diameters and a side tube. Inside the part of the larger diameter a target plate 2 is arranged. This plate consists of a foil of conductive glass of about $60\mu$ in thickness and a specific electrical resistivity of about $5 \times 10^{10}$ ohm–cm. It is secured at the edge to an annular metal support 3, which is secured by means of a plurality of metal rods 4 to the bottom 5 of the vessel.

The part of smaller diameter is closed by a flat bottom 6, which supports on the inner side a photo-electric cathode 7. This cathode consists, as usual, of antimony activated by cesium. It emits electrons under the action of a luminous image which is projected onto it by means of an optical system, designated by 8.

In the side tube 9 is arranged an electrode system 10 to produce a narrow electron beam of given intensity. The axis of this system is directed to the centre of the target plate 2. By means of the conventional deflection coils 11 and 12 the path of this electron beam can be controlled. By suitable energization of these coils the complete operative surface on the image side of the target plate is periodically scanned by the electron beam.

The wall of the tube is provided with a conductive coating 13, which acts as a collecting electrode to collect electrons set free from the target plate by secondary emission.

The glass foil 2 is coated on the image side with a thin layer 14, which serves to enhance the secondary-emission-coefficient of the surface of the target plate. It may, for example, be made of cryolite.

On the rear side the foil 2 is provided with a conductive coating 15, constituted by a layer of gold of about $0.1\mu$ in thickness. A metal wire 16 connects this coating electrically to one of the rods 4, which is interrupted by a glass bead 17 in order to insulate the coating from the supporting ring 3.

The coating 15 is covered by a thin layer of chromium 18, which extends on all sides beyond the edge of the coating, so that the latter is protected completely from the gases and vapours contained in the tube. The gold coating 15 as well as the chromium layer 18 may have been applied by means of well known evaporation or cathode sputtering methods before the assembly of the tube. The coating 15 is connected via the wire 16, the rod 4 connected thereto and a resistor 19 to the negative terminal of a direct-current voltage source 20, the positive terminal of which is connected to the wall coating 13. A second direct-current voltage source 21 serves to supply the voltage to produce the scanning beam and to provide a suitable negative potential at the photo-electric cathode 7 relative to the wall coating 13.

The voltage between this wall coating and the photo-electric cathode with the electrode system 10 is high with respect to the voltage supplied by the voltage source 20. It is so high that both the electrons of the scanning beam and those emanating from the photo-electric cathode strike the layer 14 with a sufficient velocity to set free secondary electrons from this layer. The side tube 9 contains on the inner wall an annular gold layer 22. When during the manufacture of the tube cesium vapour is introduced into the vessel, this layer absorbs the cesium, which would otherwise settle on the electrode system 10. This gold layer serves, moreover, as a supply of the cesium, which fulfils a function in the operation of the target plate.

What is claimed is:

1. In a television camera tube containing cesium, a target plate comprising a conductive glass member containing an alkali metal selected from the group consisting of sodium and lithium, means for supporting the glass member along its edge within the tube, a thin conductive coating on the rear of said glass member and adhering tightly thereto, said conductive coating containing a material capable of combining with said alkali metal and also with cesium, covering means for said conductive coating to prevent it from combining with cesium, and means providing an electrical connection to the conductive coating.

2. A television camera tube as set forth in claim 1 wherein the conductive coating is constituted of gold.

3. In a television camera tube containing cesium, a target plate comprising a conductive glass member containing at least one metal selected from the group consisting of sodium and lithium, means for supporting the glass member along its edge within the tube, a thin conductive coating on the rear side of said glass member and tightly adherent thereto, said conductive coating being constituted of a material capable of combining with sodium and lithium and cesium, a protective layer completely covering the conductive coating, said layer being constituted of a material which retains cesium and which does not form an alloy or compound with the material of the conductive coating, and means providing an external connection to the conductive coating.

4. A television camera tube as set forth in claim 3 wherein the protective layer is constituted of chromium.

5. A television camera tube as set forth in claim 4 wherein the conductive coating is constituted of gold.

6. A television camera tube comprising a photo-cathode containing cesium, a target electrode comprising a glass member having a resistivity in the range of $10^9$ to $10^{12}$ ohm-cm. and containing a substance from the group consisting of sodium and lithium, a conductive member engaging, and forming an electrical connection to, a surface portion of said glass member and being supported thereby and being constituted of a substance capable of combining with sodium and lithium, thereby to ensure a satisfactory electrical connection between the glass and the conductive member, and also capable of combining with cesium, and a protective layer covering the conductive member to prevent the latter from absorbing cesium.

7. A tube as set forth in claim 6 wherein the photo-cathode and target electrode are spaced apart, and means are provided for focusing electrons produced by the cathode onto the target electrode side free of the conductive member.

References Cited in the file of this patent

UNITED STATES PATENTS 2,777,970, Weimer _____ Jan. 15, 1957

FOREIGN PATENTS 510,784 Canada _____ Mar. 8, 1955